United States Patent
Ho et al.

(10) Patent No.: US 11,119,638 B2
(45) Date of Patent: Sep. 14, 2021

(54) USING FACE DETECTION TO UPDATE USER INTERFACE ORIENTATION

(71) Applicant: Apple Inc., Cupertino, CA (US)

(72) Inventors: Kelsey Y. Ho, Los Altos, CA (US); Eric J. Blumberg, Raleigh, NC (US); Benjamin Biron, Saratoga, CA (US); Colin C. Terndrup, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/427,702

(22) Filed: May 31, 2019

(65) Prior Publication Data

US 2020/0104033 A1 Apr. 2, 2020

Related U.S. Application Data

(60) Provisional application No. 62/752,090, filed on Oct. 29, 2018, provisional application No. 62/738,172, filed on Sep. 28, 2018.

(51) Int. Cl.
*G06F 3/0484* (2013.01)
*G06F 21/32* (2013.01)
(Continued)

(52) U.S. Cl.
CPC .......... *G06F 3/04845* (2013.01); *G06F 3/011* (2013.01); *G06F 3/012* (2013.01); *G06F 3/017* (2013.01); *G06F 21/32* (2013.01); *G06K 9/00288* (2013.01); *H04N 5/2256* (2013.01); *G06F 2200/1614* (2013.01); *G06F 2221/2149* (2013.01)

(58) Field of Classification Search
None
See application file for complete search history.

(56) References Cited

U.S. PATENT DOCUMENTS 8,358,321 B1 * 1/2013 Weidner .................. G09G 5/00
  345/619
9,262,999 B1 * 2/2016 Froment ................ G06F 3/017
(Continued)

OTHER PUBLICATIONS

Lung-Pan Cheng, Fang-I Hsiao, Yen-Ting Liu, Mike Y. Chen; "iRotate: Automatic Screen Rotation based on Face Orientation;" Department of Computer Science and Information Engineering,Department of Electrical Engineering; National Taiwan University; {r98922168,b96902005,b97901121,mikechen}@csie.ntu.edu.tw, CHI 2012, May 5-10, 2012, Austin, TX, USA. Copyright 2012 ACM; 8 pages.

*Primary Examiner* — Christopher J Fibbi
(74) *Attorney, Agent, or Firm* — Kowert, Hood, Munyon, Rankin & Goetzel, P.C.; Gareth M. Sampson

(57) ABSTRACT

An orientation of an application user interface (e.g., text and/or content) on a display of a device may be determined by an orientation of the device relative to gravity. In situations where the orientation of the device relative to gravity does not provide a confident or accurate orientation for the application user interface, orientation of the application user interface may be determined from face orientation data. Face orientation data may be obtained from a face detection process operating on images of the user captured during a facial recognition process or during an attention detection process.

20 Claims, 8 Drawing Sheets

(51) Int. Cl.
  *G06K 9/00* (2006.01)
  *G06F 3/01* (2006.01)
  *H04N 5/225* (2006.01)

(56) References Cited

U.S. PATENT DOCUMENTS

| | | | |
|---|---|---|---|
| 9,342,143 B1 * | 5/2016 | Rhodes | G06F 1/1686 |
| 9,565,365 B2 | 2/2017 | Gardiner et al. | |
| 2010/0066763 A1 * | 3/2010 | Macdougall | G06F 1/1626 |
| | | | 345/656 |
| 2012/0057064 A1 | 3/2012 | Gardiner et al. | |
| 2013/0069988 A1 * | 3/2013 | Kamei | G06F 1/1637 |
| | | | 345/658 |
| 2013/0227678 A1 * | 8/2013 | Kang | G06K 9/00335 |
| | | | 726/19 |
| 2016/0274622 A1 * | 9/2016 | Braun | G06F 1/1626 |
| 2018/0018946 A1 * | 1/2018 | Park | G06T 7/74 |

* cited by examiner

USING FACE DETECTION TO UPDATE USER INTERFACE ORIENTATION

PRIORITY CLAIM

This patent claims priority to U.S. Provisional Patent Application No. 62/738,172 to Ho et al., entitled "USING FACE DETECTION TO UPDATE DEVICE ORIENTATION", filed Sep. 28, 2018 and to U.S. Provisional Patent Application No. 62/752,090 to Ho et al., entitled "USING FACE DETECTION TO UPDATE USER INTERFACE ORIENTATION", filed Oct. 29, 2018, both of which are incorporated by reference in their entirety.

BACKGROUND

1. Technical Field

Embodiments described herein relate to methods and systems for updating an orientation of a user interface display on a device. More particularly, embodiments described herein relate to using a face detection process to update the orientation of the user interface display.

2. Description of Related Art

Mobile or portable devices such as mobile phones, tablets, or e-readers often have rectangular screens that can present content (e.g., web pages, application data, text, etc.) in either a portrait orientation (e.g., vertically oriented) or a landscape orientation (e.g., horizontally oriented). The orientation that the content is presented is often determined using accelerometers and/or other inertial sensors that determine the orientation of the device relative to gravity.

There are, however, often situations in which these sensors cannot accurately or confidently determine the orientation of the device relative to gravity and the device will not change or update the orientation of the content to the proper orientation for the user or will update the orientation incorrectly. Additionally, the device may not be able to provide the content in a proper orientation to the user when the device is lying flat (e.g., face up on a flat surface). When lying flat, even though the sensors may be accurately aware of the position of the device, the orientation relative to the user may be unknown. In either of these situations, the user may become frustrated with the need to reorient the device and/or move the device to get content to display in the proper orientation.

SUMMARY

In certain embodiments, face orientation data obtained from a face detection process is used to determine or update the orientation of an application user interface (e.g., text and/or content) being displayed on a display of a device. The face detection process may operate on images of the user captured during a facial recognition process or an attention detection process being operated by a facial recognition network (e.g., an image signal processor network). The face orientation data may be used in situations where the orientation of the application user interface is not confidently or accurately determined by motion of the device relative to gravity.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
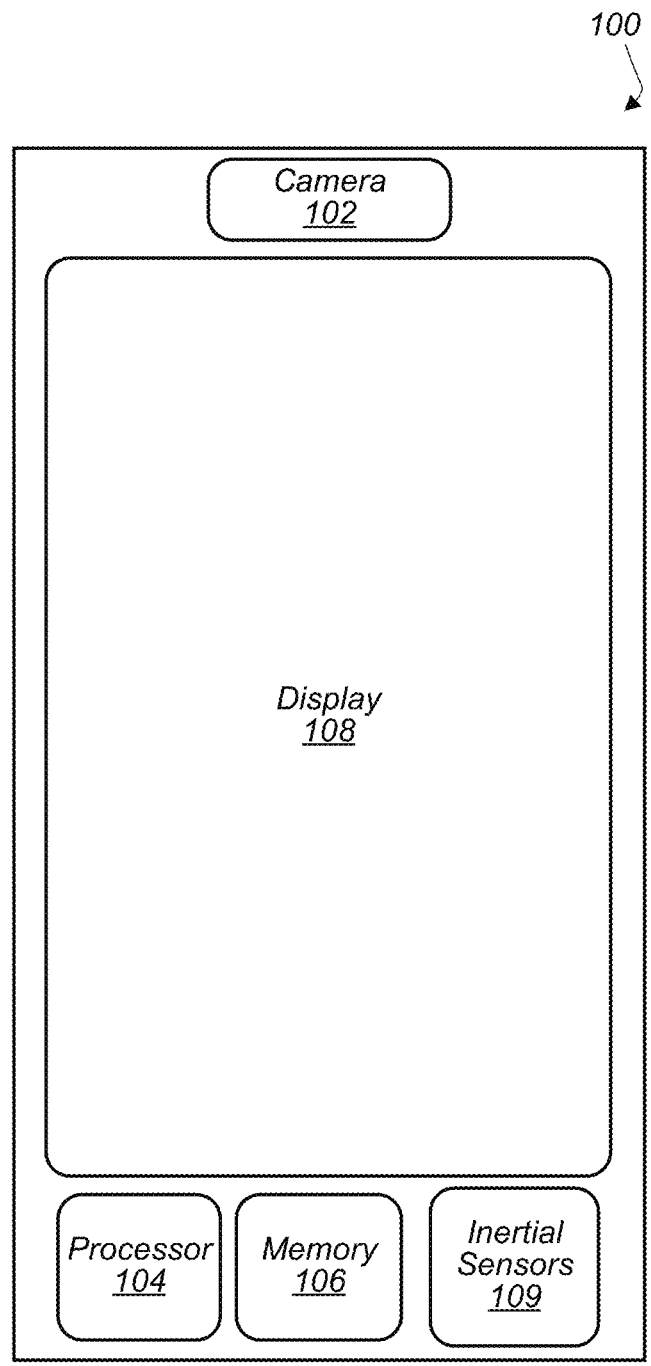
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108.

Display 108 may be, for example, an LCD screen, an LED screen, or touchscreen. In some embodiments, display 108 includes a user input interface for device 100 (e.g., the display allows interactive input for the user). Display 108 may be used to display photos, videos, text, documents, web content, and other user-oriented and/or application-oriented media. In certain embodiments, display 108 displays a graphical user interface (GUI) that allows a user of device 100 to interact with applications operating on the device. The GUI may be, for example, an application user interface that displays icons or other graphical images and objects that represent application programs, files, and commands associated with the application programs or files. The graphical images and/or objects may include windows, fields, dialog boxes, menus, buttons, cursors, scrollbars, etc. The user can select from these graphical images and/or objects to initiate functions associated with device 100.

Figure 2:
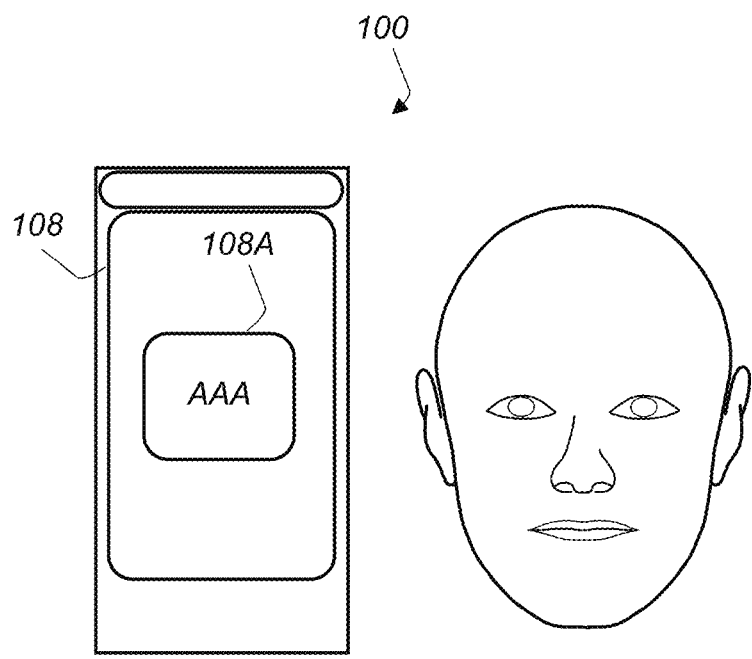
FIG. 2 depicts a representation of an embodiment of an application user interface presented on a display in a normal or upright portrait orientation.
Figure 3:
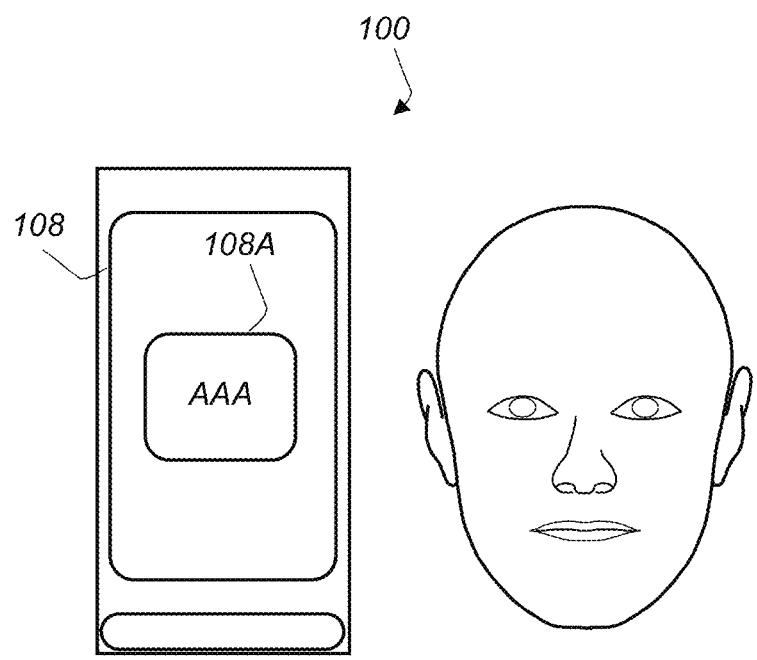
FIG. 3 depicts a representation of an embodiment of an application user interface presented on a display in an upside down portrait orientation.

In certain embodiments, display 108 has an aspect ratio where the display is longer on one side (e.g., the screen is taller than it is wider). For example, display 108 may have a 4:3 or 16:9 "wide-screen" aspect ratio. With wide-screen aspect ratios, display 108 may have a normal or "portrait" orientation where application user interface 108A is presented on the display with the longer side oriented vertically to the user, as shown in FIG. 2. In the portrait orientation, application user interface 108A (e.g., text and/or content) is displayed horizontally across the short side of display 108 for the user to view. In some embodiments, the portrait orientation can include either an upright portrait orientation (application user interface 108A is displayed in a normal vertical orientation on display 108 relative to the user), shown in FIG. 2, or an upside down portrait orientation (application user interface 108A is displayed on display 108 upside down from the normal vertical orientation of the display), shown in FIG. 3.

Figure 4:
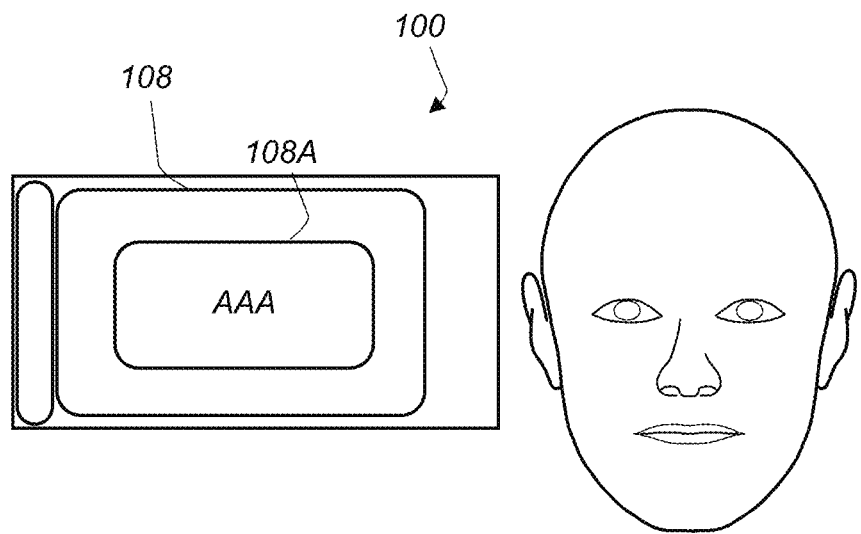
FIG. 4 depicts a representation of an embodiment of an application user interface presented on a display in a landscape left orientation.
Figure 5:
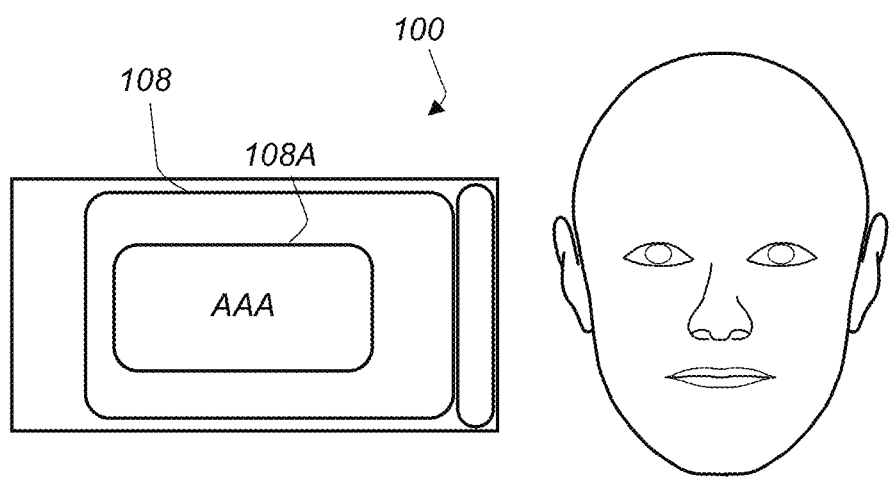
FIG. 5 depicts a representation of an embodiment of an application user interface presented on a display in a landscape right orientation.

In certain embodiments, application user interface 108A can be rotated 90° from the portrait orientation to a "landscape" orientation, as shown in FIG. 4. In the landscape orientation, application user interface 108A is presented to the user on display 108 with the shorter side oriented vertically to the user. In the landscape orientation, application user interface 108A is displayed horizontally across the long side of display 108 for the user to view. In some embodiments, the landscape orientation may include a landscape left orientation (e.g., application user interface 108A is rotated left 90° from the normal portrait orientation), shown in FIG. 4, or a landscape right orientation (e.g., application user interface 108A is rotated right 90° from the normal portrait orientation), shown in FIG. 5.

In certain embodiments, as shown in FIG. 1, device 100 includes one or more inertial sensors 109. Inertial sensors 109 may include, but not be limited to, accelerometers and gyroscopes. Inertial sensors 109 may be used to detect motion and orientation of device 100. In certain embodiments, inertial sensors 109 are used to detect motion and orientation of device 100 relative to gravity. Inertial sensor 109 may be, for example, a three-dimensional accelerometer that detects acceleration in three axial directions of device 100 (e.g., the up-down direction (y-axis), the left-right direction (x-axis), and the front-rear direction (the z-axis)). The accelerometer may provide device 100 with the capability to determine the inclinations and movements of the device in the x-axis, y-axis and z-axis directions. In some embodiments, inertial sensors 109 may include a gyroscope that detects rotation of device 100 about the z-axis. Acceleration or turn rate data detected by inertial sensors 109 may be processed by device 100 (e.g., a processor on the device or the motion framework as described herein) to enable determination of the position, orientation, and/or movement of the device.

Figure 6:
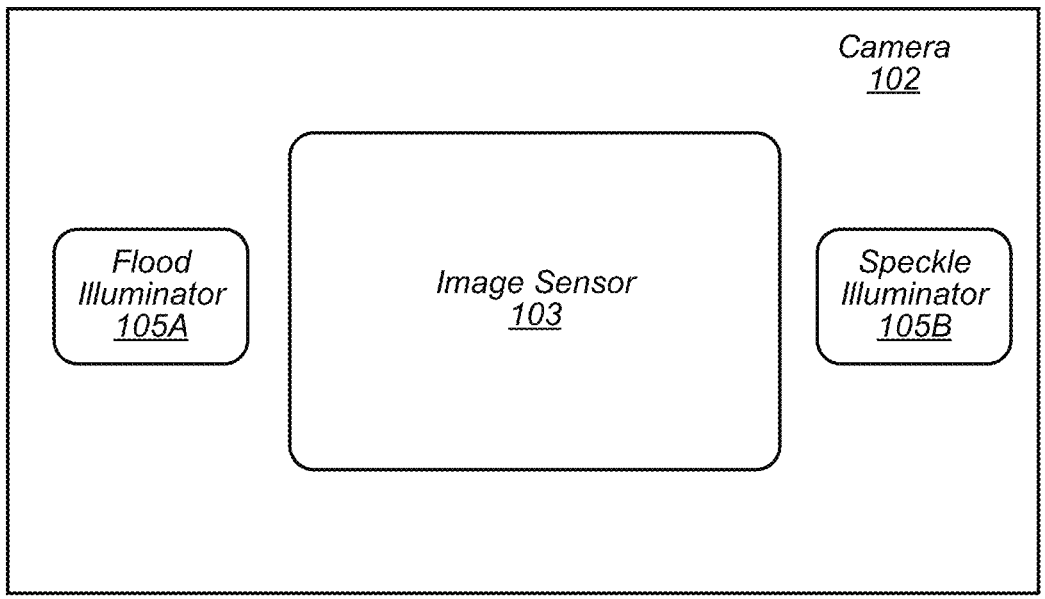
FIG. 6 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 6 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a pattern (speckle pattern) projector). In some embodiments, the flood IR source and pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection and/or facial recognition authentication, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light.

Depth information may be captured using any suitable depth imaging system, examples of which include structured light and time of flight systems. In some instances, the depth imaging system may utilize an illuminator in providing depth detection or generating a depth map image. For example, illuminator 105B may provide IR illumination with a pattern (e.g., patterned infrared (IR) illumination). The pattern may be a pattern of light with a known, and controllable, configuration and pattern projected onto a subject (e.g., a structured pattern of light). In certain embodiments, the pattern is a speckle pattern (e.g., a pattern of dots). The pattern may, however, include any structured or semi-structured pattern of light features. For example, the pattern may include, but not be limited to, dots, speckles, stripes, dashes, nodes, edges, and combinations thereof.

Illuminator 105B may include a VCSEL array configured to form the pattern or a light source and patterned transparency configured to form the pattern. The configuration and pattern of the pattern provided by illuminator 105B may be selected, for example, based on a desired pattern density (e.g., speckle or dot density) at the subject. Image sensor 103 may capture images of the subject illuminated by the pattern. The captured image of the pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 7:
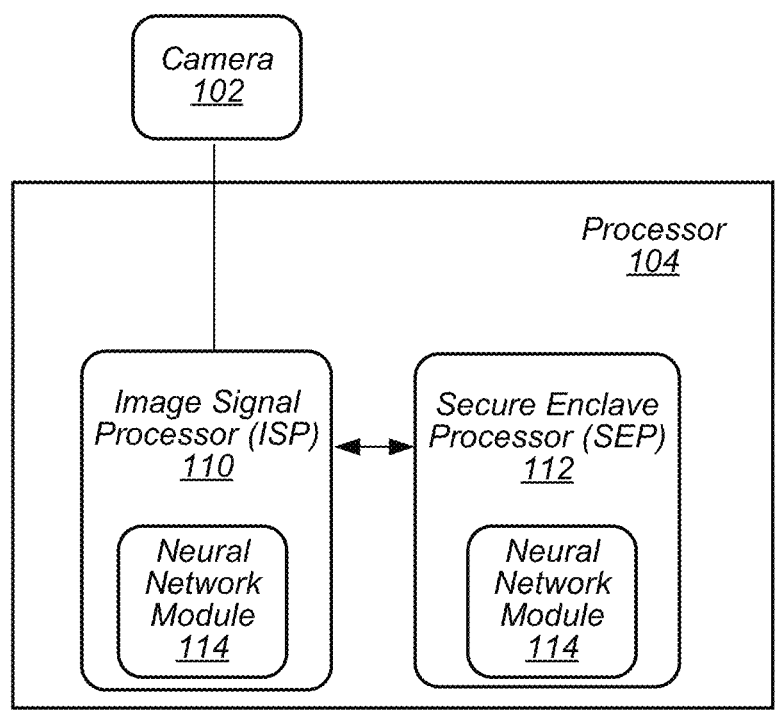
FIG. 7 depicts a representation of an embodiment of a processor on a device.

Images captured by camera 102 may be processed by processor 104. FIG. 7 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryption keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., an image enrollment process or a registration process) to capture images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a patterned illumination image used to generate a depth map image). In certain embodiments, ISP 110 and/or SEP 112 process the flood IR images and patterned illumination images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and patterned illumination images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and patterned illumination image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

In certain embodiments, data from images of a user captured and processed by ISP 110 and/or SEP 112 (e.g., images captured and processed in a facial recognition authentication process) is used to assist determining orientation of display 108 on device 100. For example, data from captured images of the user may be used to determine an orientation of display 108 (e.g., one of the orientations of display 108 shown in FIGS. 2-5) when data from inertial sensors 109 is ambiguous or inconclusive in determining the orientation of the display.

Figure 8:
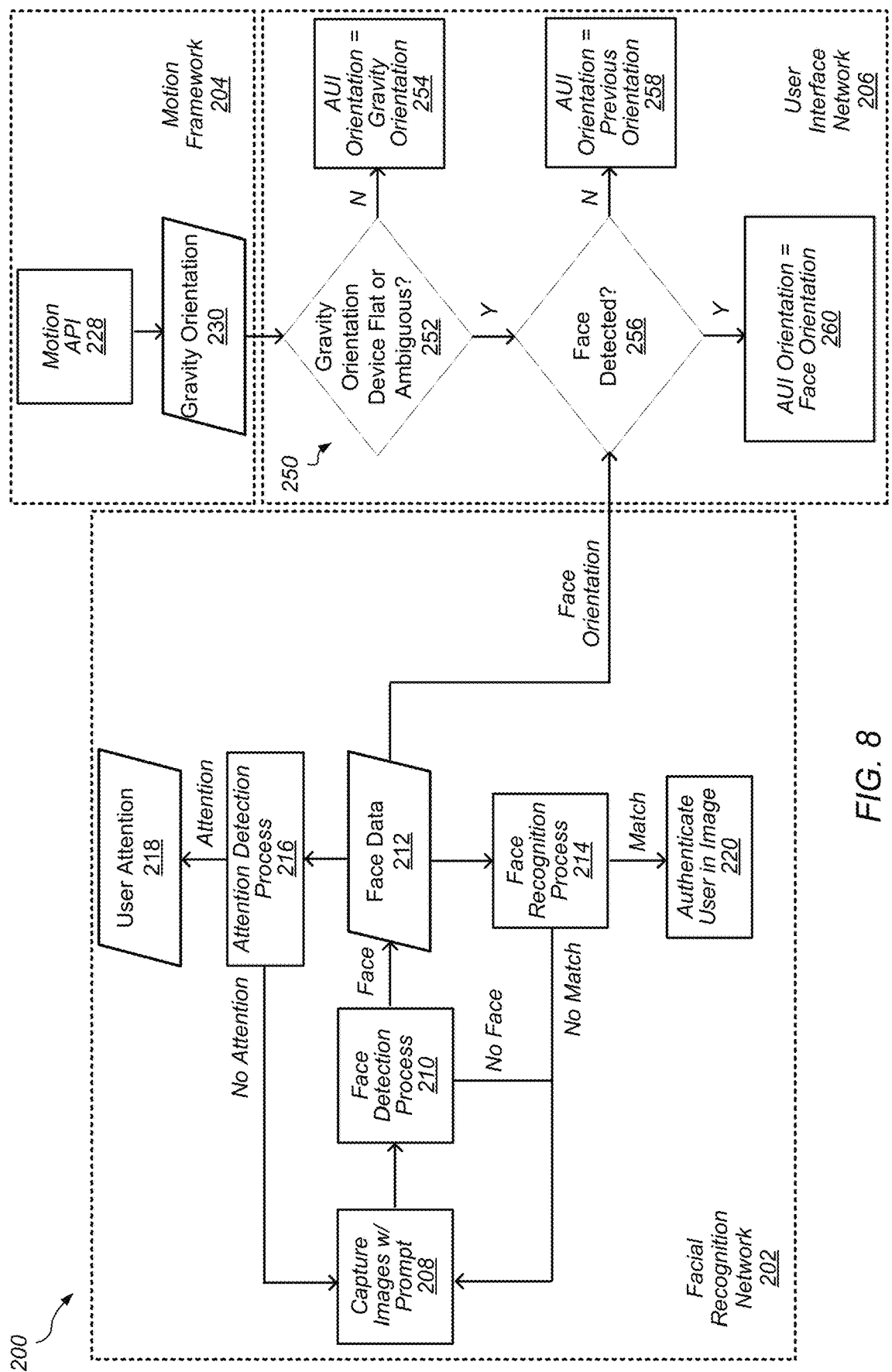
FIG. 8 depicts a flowchart of an embodiment of a user interface orientation determination process.

FIG. 8 depicts a flowchart of an embodiment of user interface orientation determination process 200. In certain embodiments, process 200 operates using a combination of facial recognition network 202, motion framework 204, and user interface network 206. Facial recognition network 202 may capture images of a user in response to a request or prompt by a user and operate on the captured images to make one or more determinations about the user in the captured images as described herein. Motion framework 204 may operate to assess motion of device 100 relative to gravity using inertial sensors 109 and/or other sensors and provide an output of the assessed motion. User interface network 206 may operate to determine properties of the user interface such as the orientation of application user interface 108A on display 108.

Process 200 may begin with capturing one or more images of the user in 208 using camera 102. Camera 102 may capture the images in 208 in response to a prompt by the user or a user generated request. For example, the images may be captured when the user attempts to access device 100 by pressing a button (e.g., a home button or virtual button) on device 100, by moving the device into a selected position relative to the user's face (e.g., the user moves the device such that the camera is pointed at the user's face or lifting the device from a table), and/or by making a specific gesture or movement with respect to the device (e.g., tapping on the screen, swiping the user's finger across the display, or picking the device off the table). In some embodiments, the images are captured of the user when the user is attempting to be authenticated as an authorized user of device 100. For example, the captured images may be "unlock attempt" images of the user being used to unlock device 100, as described herein, or the captured images may be used to authorize the user to have access to a selected functionality of the device, as described herein. In some embodiments, the images are captured of the user when the user is attempting to utilize attention aware applications on device 100.

It is to be understood that, as described herein, captured images may include either flood IR images or patterned illumination images (e.g., images used to generate depth map images), or combinations thereof. The images captured in 208 may include a single image of the face of the user (e.g., a single flood IR image or single patterned illumination image) or the images may include a series of several images of the face of the user taken over a short period of time (e.g., one second or less). In some embodiments, the series of several images of the face of the user includes pairs of flood IR images and patterned illumination images (e.g., pairs of consecutive flood IR and patterned illumination images). In some implementations, a captured image may be a composite of several images of the user illuminated by the flood illuminator and/or the pattern illuminator.

After images are captured in 208, face detection process 210 may be used to determine and locate one or more faces in the captured images. In certain embodiments, face detection process 210 operates on a flood IR image captured in 208 (e.g., an image captured while the subject is illuminated with flood IR illumination). Face detection process 210 may include encoding a captured image (e.g., a flood IR image) to generate feature vectors for the image and assessing the generated feature vectors to determine whether or not a face is present in the image. Detection of the face may be provided in face data 212. In some embodiments, face data 212 output from face detection process 210 when a face is detected may include, but not be limited to, detection and position of the face in the image (which may be represented, for example, by a bounding box for the face in the image), an orientation of the face relative to device 100, a pose of the face (e.g., the pitch, yaw, and roll of the face in the bounding box), and a distance between the face and the camera. Examples of face detection processes are described in U.S. patent application Ser. No. 15/910,551 to Gernoth et al. and U.S. Provisional Patent Application No. 62/679,850 to Kumar et al., which are incorporated by reference as if fully set forth herein.

In certain embodiments, if no face is detected by face detection process 210, additional images may be captured again in 208. In some embodiments, additional images are automatically captured in 208. For example, facial recognition network 202 may operate to automatically capture additional images in 208 until a face is detected in captured images or a selected number of failed attempts to detect a face is reached (e.g., the image capture process times out after the selected number of failed attempts). In some embodiments, additional images are captured in 208 in response to a new prompt from the user (e.g., a prompt as described above).

As shown in FIG. 8, face data 212 may be provided to facial recognition process 214 and/or attention detection process 216. Face data 212 may, for example, be provided to facial recognition process 214 in response to the user attempting to be authenticated as an authorized user of device 100. Face data 212 may, for example, be provided to attention detection process 216 in response to the user attempting to utilize attention aware applications on device 100. An example of an attention detection process is described in U.S. patent application Ser. No. 15/934,578 to Gernoth et al., which is incorporated by reference as if fully set forth herein.

Output of attention detection process 216 may be determined to be "attention" or "no attention", as shown in FIG. 8. If the determined output is "no attention" then operation may return to the capture of images in 208. As described above, additional images may be captured in 208 either automatically or in response to another prompt from the user. If the determined output is "attention" then an output of "user attention" may be provided in 218. In some embodiments, output from attention detection process 216 may be utilized as part of facial recognition process 214. For example, facial recognition process 214 may utilize a determination of user attention in 218 as a gate in the facial recognition process (e.g., the user must be determined to be paying attention to device 100 to be authenticated using the facial recognition process).

In certain embodiments, face data 212 is used in facial recognition process 214 to attempt to authenticate a user as an authorized user of device 100 using facial recognition of the user. In certain embodiments, facial recognition process 214 is used to authenticate a user using an enrollment profile (e.g., a template space generated during enrollment of the authorized user) on device 100. Authentication of the authorized user may allow the user to access and use device 100 (e.g., unlock the device) and/or have access to a selected functionality of the device (e.g., unlocking a function of an application running on the device, payment systems (i.e., making a payment), access to personal data, expanded view of notifications, etc.). In certain embodiments, facial recognition process 214 is used as a primary biometric authentication process for device 100 (after enrollment of the authorized user). In some embodiments, facial recognition process 214 is used as an authentication process in addition to additional authentication processes (e.g., fingerprint authentication, another biometric authentication, passcode entry, password entry, and/or pattern entry). In some embodiments, another authentication process (e.g., passcode entry, pattern entry, other biometric authentication) may be used to access device 100 if the user fails to be authenticated using facial recognition process 214.

Figure 9:
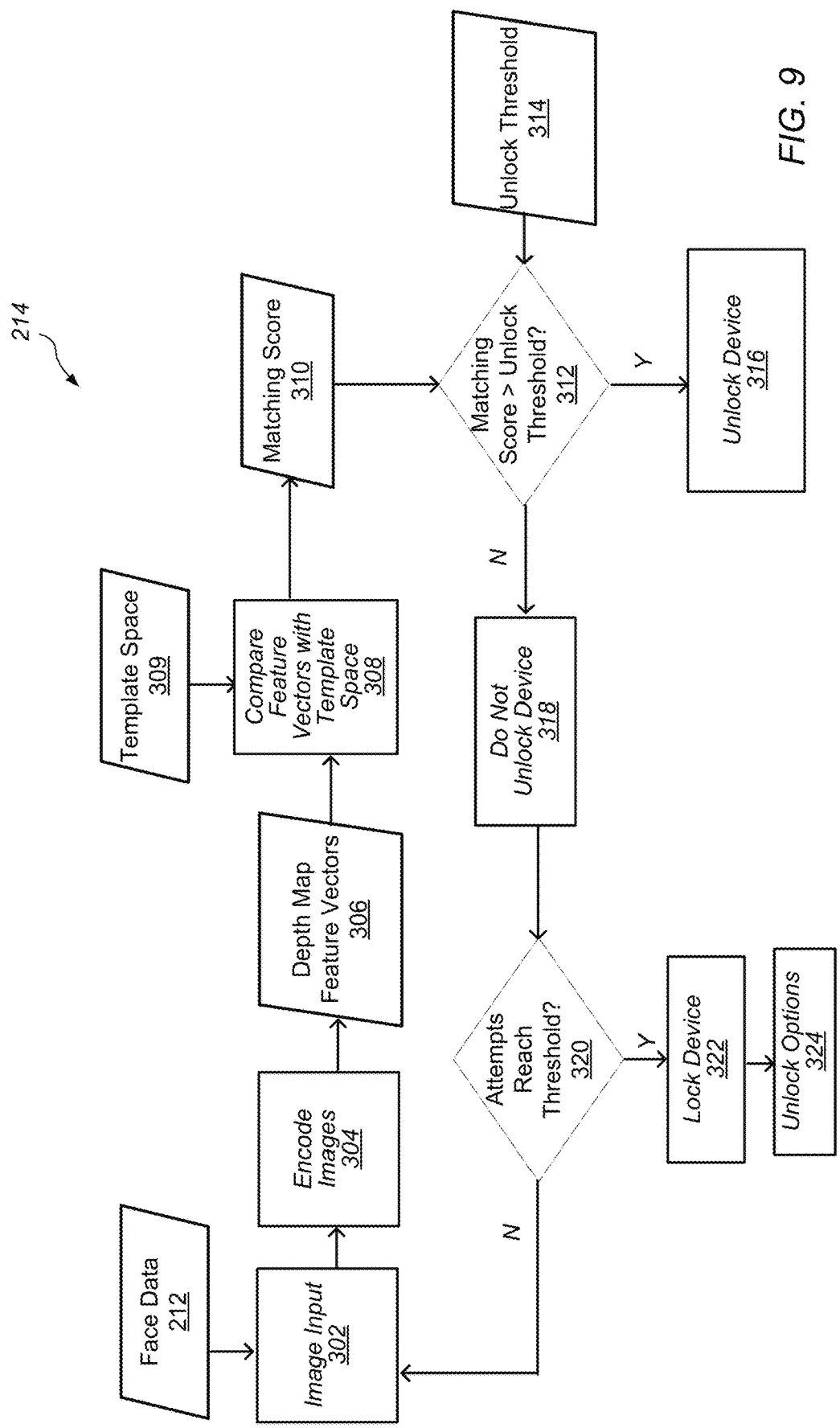
FIG. 9 depicts a flowchart of an embodiment of a facial recognition process.

FIG. 9 depicts a flowchart of an embodiment of facial recognition process 214. As described above, the images captured in 208, shown in FIG. 8, may include combinations of flood IR images and patterned illumination images (e.g., pairs of flood IR images and patterned illumination images). The images captured in 208 may be provided to facial recognition process 214 as image input 302 along with face data 212.

In 304, images from image input 302 are encoded to define the facial features of the user as one or more feature vectors in a feature space. Feature vectors 306 may be the output of the encoding of the images in 304.

In certain embodiments, in 308, feature vectors 306 are compared to feature vectors in the templates of template space 309 to get matching score 310. In certain embodiments, template space 309 includes a template for an enrollment profile for an authorized user on device 100 (e.g., a template generated during an enrollment process). Matching score 310 may be a score of the differences between feature vectors 256A and feature vectors in template space 309 (e.g., feature vectors for the authorized user generated during the enrollment process). Matching score 310 may be higher when feature vectors 306 are closer to (e.g., the less distance or less differences) the feature vectors in template space 309.

In some embodiments, comparing feature vectors and templates from a template space to get a corresponding matching score includes using one or more classifiers or a classification-enabled network to classify and evaluate the differences between the generated feature vectors and feature vectors from the template space. Examples of different classifiers that may be used include, but are not limited to, linear, piecewise linear, nonlinear classifiers, support vector machines, and neural network classifiers. In some embodiments, matching score 310 is assessed using distance scores between feature vectors (e.g., feature vectors 306) and templates from the template space (e.g., template space 309).

In 312, matching score 310 is compared to unlock threshold 314 for device 100. Unlock threshold 314 may represent a minimum difference (e.g., distance in the feature space) in features (as defined by feature vectors) between the face of the authorized user and the face of the user in the unlock attempt image that device 100 requires in order to unlock the device (or unlock a feature on the device). For example, unlock threshold 314 may be a threshold value that determines whether the unlock feature vectors (e.g., feature vectors 306) are similar enough (e.g., close enough) to the templates associated with the authorized user's face (e.g., the templates in the template space). In certain embodiments, unlock threshold 314 is set during manufacturing and/or by the firmware of device 100. In some embodiments, unlock threshold 314 is updated (e.g., adjusted) by device 100 during operation of the device.

As shown in FIG. 9, in 312, if matching score 310 is above unlock threshold 314, the user's face in the captured images substantially matches the face of the authorized user (e.g., facial recognition process 214 outputs a "match" as shown in FIG. 8). With the user's face being a "match" the user in the captured images is authenticated as the authorized user for the enrollment profile on device 100 and the device is unlocked in 316, as shown in FIG. 9 (and the user in the image is authenticated in 220, shown in FIG. 8). In certain embodiments, unlocking device 100 in 316 includes allowing the user to access and use the device (e.g., unlock the device) and/or allowing the user to have access to a selected functionality of the device (e.g., unlocking a function of an application running on the device, payment systems (i.e., making a payment), access to personal data, expanded view of notifications, etc.).

In 312, if matching score 310 is below unlock threshold 314 (e.g., not equal to or above the unlock threshold), then device 100 is not unlocked in 318 (e.g., the device remains locked and facial recognition process 214 outputs a "no match" as shown in FIG. 8). It should be noted that device 100 may be either locked or unlocked if matching score 310 is equal to unlock threshold 314 depending on a desired setting for the unlock threshold (e.g., tighter or looser restrictions). Additionally, either option for an equal matching score comparison may be also applied as desired for other embodiments described herein.

In certain embodiments, the unlock attempts are compared to a threshold in 320. The threshold may be, for example, a maximum number of unlock attempts allowed or a maximum allotted time for unlock attempts. In certain embodiments, a number of unlock attempts is counted (e.g., the number of attempts to unlock device 100 with a different unlock attempt image captured in 302) and compared to the maximum number of unlock attempts allowed.

In certain embodiments, if the unlock attempts reaches the threshold (e.g., number of unlock attempts reaches the maximum number of attempts allowed), then device 100 is locked from further attempts to use facial authentication in 322. In some embodiments, when the device is locked in 322, an error message may be displayed (e.g., on display 108) indicating that facial recognition process 214 has failed and/or the desired operation of device 100 is restricted or prevented from being performed. Device 100 may be locked from further attempts to use facial authentication in 322 for a specified period of time and/or until another authentication protocol is used to unlock the device. For example, unlock options 324 may include using another authentication protocol to unlock device 100.

Unlock options 324 may include the user being presented with one or more options for proceeding with a different type of authentication to unlock or access features on device 100 (e.g., the user is presented options for proceeding with a second authentication protocol). Presenting the options may include, for example, displaying one or more options on display 108 of device 100 and prompting the user through audible and/or visual communication to select one of the displayed options to proceed with unlocking the device or accessing features on the device. The user may then proceed with unlocking/accessing device 100 using the selected option and following additional audible and/or visual prompts as needed. After successfully being authenticated using the selected option, the user's initial request for unlocking/accessing device 100 may be granted. Unlock options 324 may include, but not be limited to, using a passcode, a password, pattern entry, a different form of biometric authentication, or another authentication protocol to unlock device 100. In some embodiments, unlock options 324 includes providing a "use passcode/password/pattern" affordance that, when selected causes display of a passcode/password/pattern entry user interface, or a passcode/password/pattern entry user interface, or a "use fingerprint" prompt that, when displayed, prompts the user to place a finger on a fingerprint sensor for the device.

If the unlock attempts are below the threshold in 320 (e.g., number of unlock attempts are below the maximum number of attempts allowed), then new images of the user may be captured in 208, shown in FIG. 8. In some implementations, device 100 automatically captures the new images of the user's face without prompting the user (e.g., capturing of the new images is automatically implemented and/or hidden from the user). In some implementations, device 100 notifies the user (either visually and/or audibly) that facial recognition is being re-initiated. In some embodiments, device 100 may prompt the user to provide input to re-initiate the facial recognition process. For example, the user may be prompted to acknowledge or otherwise confirm (either visually and/or audibly) the attempt to re-initiate the facial recognition process.

Returning to process 200, shown in FIG. 8, in certain embodiments, face data 212 is provided to user interface network 206. Face data 212 provided to user interface network 206 may include an orientation of the face in the captured images relative to device 100 (e.g., the face orientation in the captured images). In certain embodiments, the face orientation is provided asynchronously from facial recognition network 202 to user interface network 206 once a face is detected by face detection process 210. For example, the face orientation may be provided to user interface network 206 once for each output of face data 212 from face detection process 210. In some embodiments, face orientation data is provided from facial recognition network 202 to user interface network 206 using a dedicated path for communicating data (i.e., a path shared by only the involved networks).

Face detection process 210 may be capable of determining face orientations at any angle and providing output at any angle. In some embodiments, however, the face orientation provided by facial recognition network 202 is output as one of a set of discrete values (e.g., one of a set of discrete angles) to user interface network 206. For example, the face orientation may be provided as one of four discrete angles— 1) face is 0° relative to device 100; 2) face is 90° relative to the device; 3) face is 180° relative to the device; or 4) face is 270° relative to the device. The discrete angle to be output may be determined by outputting the discrete angle that is closest to the orientation angle determined by face detection process 210. For example, angles between 315° and 45° may be output as 0°, angles between 45° and 135° may be output as 90°, angles between 135° and 225° may be output as 180°, and angles between 225° and 315° may be output as 270°. Angles determined at any of the midpoints between outputs (e.g., at 45° angle offsets from the outputs) may be provided at either the lower or higher angle. Providing one of the four discrete orientation outputs to user interface network 206 may simplify the input to the user interface network and allow the user interface network to process the face orientation more quickly.

In certain embodiments, as shown in FIG. 8, user interface network 206 operates process 250 to determine an orientation of application user interface 108A displayed on display 108 of device 100. As described above, face orientation is provided as one input to process 250. Gravity orientation 230 from motion framework 204 may be another input to process 250. Motion framework 204 may be, for example, a framework that includes predefined classes and functions that can be used to process input from inertial sensors 109 and manage hardware devices and interact with system software.

Motion API 228 may provide access to data received from inertial sensors 190. Motion API 228 may determine an orientation of device 100 relative to gravity based on the inertial sensor data (e.g., motion of the device) and output the determined orientation relative to gravity as gravity orientation 230. For example, motion API 228 may assess data from inertial sensors 109 to determine one or more gravity vectors describing the orientation of device 100 relative to gravity. The gravity vectors may then be assessed to provide a discrete output of the orientation of device 100 relative to gravity. The discrete output may be a discrete output based on, for example, how flat or how tilted device 100 is, as determined by the assessed gravity vectors.

Motion API 228 may provide the discrete output as gravity orientation 230. In certain embodiments, gravity orientation 230 includes a discrete value that is selected from either a) one of four discrete orientations of device 100 relative to gravity (e.g., device is in upright portrait, upside down portrait, landscape left, or landscape right orientation); b) an output that the orientation is ambiguous (e.g., cannot be confidently determined); or c) an output that the device is lying flat. For the output to be that the orientation is ambiguous, the gravity vectors may be below thresholds that provide confidence that the orientation shown by the gravity vectors is in a certain direction (e.g., one of the four discrete orientations described above).

For example, the threshold for the output to be one of the four discrete orientations of device 100 may be a selected minimum angle (e.g., tilt) of device 100 towards one of the four discrete orientations. Thus, gravity orientation 230 may be one of the four discrete orientations when the gravity vectors indicate that device 100 is oriented at an angle in one of the four directions above or equal to the selected minimum angle. Alternatively, gravity orientation 230 may be that the orientation is ambiguous when the gravity vectors indicate that device 100 is oriented at an angle below the selected minimum angle. The selected minimum angle may be, for example, an angle that provides some minimal confidence that the device is in an orientation when the angle threshold is achieved. Thus, the output may be that the orientation is ambiguous when the gravity vectors indicate that device 100 is oriented somewhere between two directions with minimal confidence that it is one direction or the other. In some embodiments, the selected minimum angle is about 30 degrees (e.g., a 30 degree tilt or angle towards a portrait or landscape orientation). The selected minimum angle may, however, vary based on operation of the device (e.g., bias errors in one or more sensors) and/or desired operation of the device.

Figure 10:
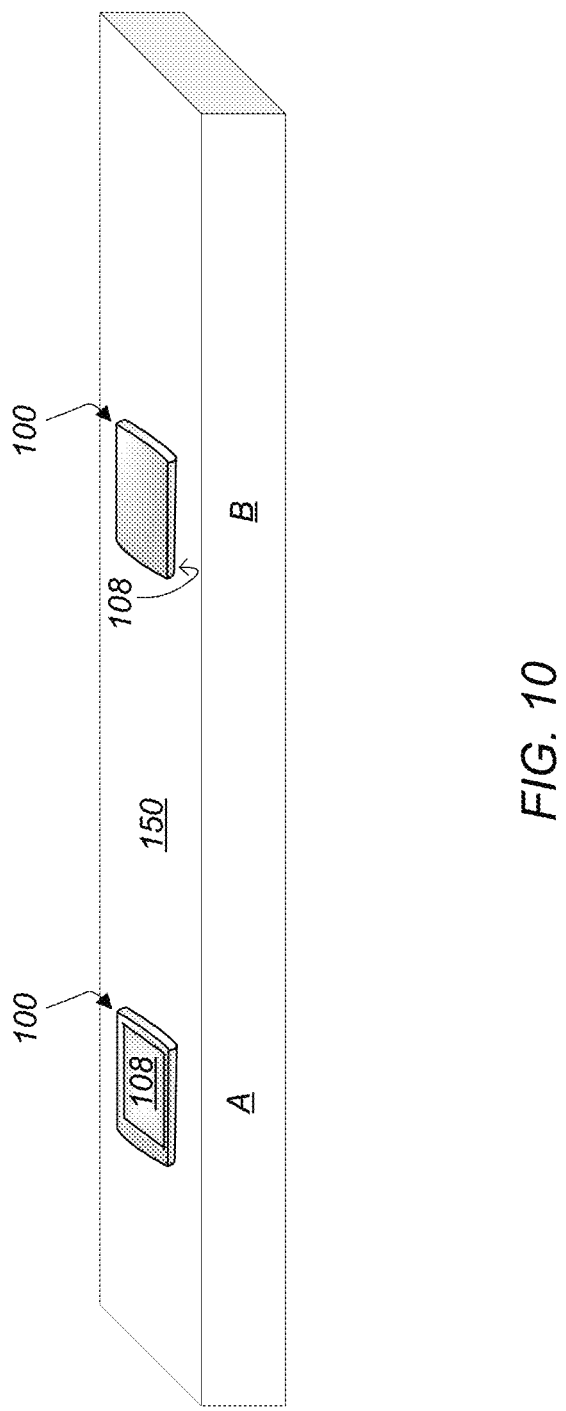
FIG. 10 depicts a representation of examples of embodiments of a device lying flat on a surface.

For the output to be that device 100 is lying flat, the gravity vectors may indicate that the device is lying flat or within certain thresholds of lying flat (e.g., the gravity vectors do not provide indication that the device has moved past certain tilt thresholds from a position of the device lying flat). The device lying flat output may indicate that device 100 is lying face up (display 108 is pointed upwards) or lying face down (display 108 is pointed downwards). For example, device 100 may be laying on a surface in either a face up position or a face down position where the back and front surfaces of device 100 are parallel (or near parallel) to the floor, a table, or another horizontally flat surface. FIG. 10 depicts a representation of examples of embodiments of device 100 lying flat on surface 150. Surface 150 may, for example, a table or another horizontally flat (or substantially flat) surface. Device 100 is shown to be lying flat in either the face up position (e.g., position "A" with display 108 facing up from surface 150) or the face down position (e.g., position "B" with display 108 facing down on surface 150).

As shown in FIG. 8, gravity orientation 230 may be input into process 250 at 252. In 252, gravity orientation 230 may be assessed to determine if device 100 is lying flat ("device flat") or ambiguous. If gravity orientation 230 is determined not to be lying flat or ambiguous (e.g., unambiguous), then the output of 252 is "N" and user interface network 206 determines (e.g., outputs) that application user interface 108A has gravity orientation 230 (e.g., one of the four discrete orientations—upright portrait, upside down portrait, landscape left, or landscape right orientation—determined by motion API 228) in 254. Display 108 may then present application user interface 108A with the discrete orientation determined by motion API 228 (e.g., gravity orientation 230).

If gravity orientation 230 is determined to be lying flat or ambiguous, then the output of 252 is "Y" and process 250 continues in 256. The face orientation data from face data 212 is input into 256. In 256, the face orientation data may be assessed to determine if a face has been detected. For example, if a face has been detected by face detection process 210, then the input to 256 includes an orientation of the face. If a face was not detected by face detection process 210, then the input to 256 does not include an orientation of the face (e.g., there is not face data as no face was detected). If no face has been detected, then the output of 256 is "N" and user interface network 206 determines that application user interface 108A remains at the previous orientation in 258 (e.g., the orientation detected or known by the user interface network before any images were captured and any gravity orientation was determined by motion framework 204).

If a face has been detected, then the output of 256 is "Y" and user interface network 206 determines that application user interface 108A has an orientation determined by the face orientation in 260 (e.g., the orientation of the face relative to device 100 in the captured images). In certain embodiments, the orientation of application user interface 108A is determined in 260 by setting the orientation of the application user interface to match the orientation of device 100 relative to the face of the user in the captured images. For example, application user interface 108A is oriented to display text or content upright to the user.

As described herein, user interface network 206 may use face orientation determined from images captured by facial recognition network 202 in situations where device 100 is positioned ambiguously relative to the user. For example, when device 100 is lying flat or data from inertial sensors 109 cannot confidently determine device orientation, user interface network 206 may use the face orientation provided by face detection process 210 to rotate the application user interface to a correct orientation relative to the user. Rotating the application user interface to the correct orientation may provide a more satisfactory experience for the user in using and interacting with device 100.

Additionally, rotation of the application user interface based on the face orientation may not be limited to situations in which facial recognition process 214 is successful in authenticating the user and/or attention detection process 216 determines a user has attention to device 100 (e.g., the user is paying attention to the device). For example, rotation of the application user interface based on the face orientation may be possible anytime a face is detected by facial recognition network 202 in face detection process 210 and the face detection process outputs a face orientation. Thus, it may be possible for user interface network 206 to update orientation of the application user interface using a face orientation for an unauthorized (e.g., unauthenticated) face (e.g., the orientation may be updated regardless of a decision made by facial recognition process 214 and/or attention detection process 216).

In certain implementations, orientation of the application user interface may be determined using face orientation only in situations where face orientation data is available based on a user prompted operation of facial recognition network 202 and a face is detected by face detection process 210. Limiting use of face orientation to these situations may inhibit processor drain and/or battery drain that would occur if images were continuously captured and operated on to update orientation of the application user interface based on the face orientation in the captured images.

In certain embodiments, one or more process steps described herein may be performed by one or more processors (e.g., a computer processor) executing instructions stored on a non-transitory computer-readable medium. For example, process 200 and facial recognition process 214, shown in FIGS. 8 and 9 may have one or more steps performed by one or more processors executing instructions stored as program instructions in a computer readable storage medium (e.g., a non-transitory computer readable storage medium).

Figure 11:
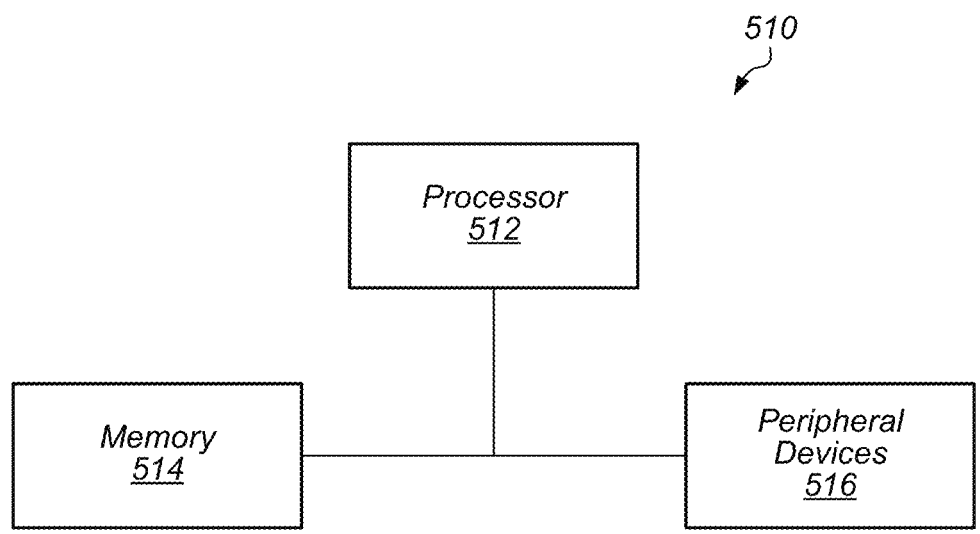
FIG. 11 depicts a block diagram of one embodiment of an exemplary computer system.

FIG. 11 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200 and facial recognition process 214, shown in FIGS. 8 and 9. In the embodiment of FIG. 11, computer system 510 includes processor 512, memory 514, and various peripheral devices 516. Processor 512 is coupled to memory 514 and peripheral devices 516. Processor 512 is configured to execute instructions, including the instructions for process 200 and/or facial recognition process 214, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 12:
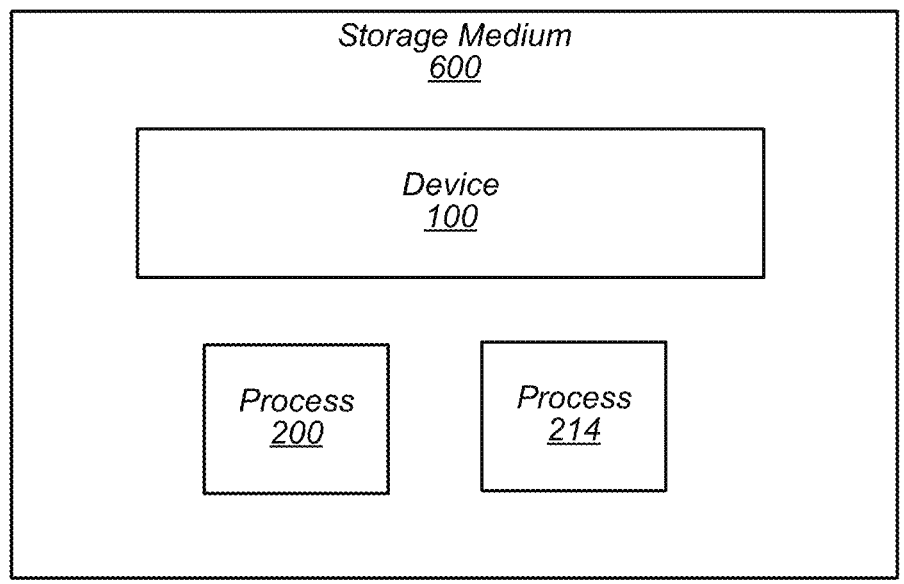
FIG. 12 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 12, other input/output (I/O) devices such as video hardware, audio hardware, user interface devices, networking hardware, etc.).

Turning now to FIG. 12, a block diagram of one embodiment of computer accessible storage medium 600 including one or more data structures representative of device 100 (depicted in FIG. 1) included in an integrated circuit design and one or more code sequences representative of process 200 and/or facial recognition process 214 (shown in FIGS. 8 and 9). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

As described herein, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
    detecting an orientation of a user interface on a display of a device, the device comprising a computer processor and a memory;
    in response to a user generated request for the device to perform a face detection process, capturing an image of a face of a user using a camera located on the device, wherein the captured image comprises an image captured while illuminating the user's face with an infrared illuminator located on the device, and wherein the face detection process determines data for an orientation of the user's face from the captured image when the user's face is detected in the captured image;
    determining an orientation of the device relative to gravity;
    in response to determining the orientation of the device relative to gravity is the device is lying flat, accessing the data for the orientation of the user's face determined by the face detection process;
    in response to determining the face of the user is detected in the captured image, updating the orientation of the user interface on the display of the device using the data for the orientation of the user's face determined by the face detection process; and
    in response to determining the face of the user is not detected in the captured image, determining the orientation of the user interface on the display of the device remains at a previous orientation of the user interface.

2. The method of claim 1, further comprising updating the orientation of the user interface on the display of the device using the data for the orientation of the user's face from the captured image in response to determining the orientation of the device relative to gravity is ambiguous.

3. The method of claim 1, wherein the orientation of the user interface on the display of the device comprises one of a portrait mode or a landscape mode for displaying the user interface.

4. The method of claim 1, wherein the face detection process comprises:
    encoding the captured image to generate feature vectors for the captured image;
    assessing the feature vectors to detect the face in the captured image; and
    providing an output indicating that the face has been detected or has not been detected in the captured image, wherein the output includes the data for the orientation of the user's face for the output indicating that the face has been detected.

5. The method of claim 1, wherein the updated orientation is determined using an orientation of the device relative to the orientation of the user's face in the captured image.

6. The method of claim 1, wherein determining the orientation of the device relative to gravity comprises assessing motion of the device using at least one of an accelerometer and a gyroscope.

7. The method of claim 1, wherein, in response to the orientation of the device relative to gravity being determined to be not lying flat, the orientation of the user interface is updated using the orientation of the device relative to gravity.

8. The method of claim 1, wherein the face detection process is operated in response to the user generated request corresponding to either a facial recognition authentication process or an attention detection process.

9. A device, comprising:
    a computer processor;
    a memory;
    a display;
    a camera;
    at least one illuminator providing infrared illumination;
    circuitry coupled to the camera and the illuminator, wherein the circuitry is configured to:
        detect an orientation of a user interface on the display;
        in response to a user generated request for the device to perform a face detection process, capture an image of a face of a user using a camera located on the device, wherein the captured image comprises an image captured while illuminating the user's face with an infrared illuminator located on the device, and wherein the face detection process determines data for an orientation of the user's face from the captured image when the user's face is detected in the captured image;
        determine an orientation of the device relative to gravity;
        in response to determining the orientation of the device relative to gravity is the device is lying flat, access the data for the orientation of the user's face determined by the face detection process;
        in response to determining the face of the user is detected in the captured image, update the orientation of the user interface on the display using the data for the orientation of the user's face determined by the face detection process; and
        in response to determining the face of the user is not detected in the captured image, determine the orientation of the user interface on the display of the device remains at a previous orientation of the user interface.

10. The device of claim 9, wherein the at least one illuminator comprises a flood infrared illuminator.

11. The device of claim 9, further comprising one or more inertial sensors on the device, wherein the orientation of the device relative to gravity is determined using at least one of the inertial sensors.

12. The device of claim 11, wherein at least one of the inertial sensors comprises an accelerometer.

13. The device of claim 11, wherein at least one of the inertial sensors comprises a gyroscope.

14. The device of claim 9, wherein the orientation comprises one of a portrait mode or a landscape mode for displaying the user interface.

15. A method, comprising:
    capturing an image of a subject using a camera located on a device in response to a user generated request, the device comprising a computer processor, a memory, and a display, wherein the captured image comprises an image captured while illuminating the subject with an illuminator located on the device;

operating, in response to the user generated request and using the computer processor, a face detection process on the captured image, wherein the face detection process is operated to detect a face of the subject illuminated by the illuminator in the captured image, and wherein the face detection process determines an orientation of the face detected in the capture image when the user's face is detected in the captured image;

determining an orientation of the device relative to gravity based on motion of the device;

in response to the orientation of the device relative to gravity being determined to be the device is lying flat and in response to determining the face of the user is detected in the captured image, determining a selected orientation for a user interface to be displayed on the display of the device based on the determined orientation of the face detected in the captured image;

in response to determining the face of the user is not detected in the captured image, determining the selected orientation for the user interface to be displayed on the display of the device remains at a previous orientation of the user interface; and displaying the user interface on the display of the device with the selected orientation.

16. The method of claim 15, wherein the selected orientation comprises one of a portrait mode or a landscape mode for displaying the user interface.

17. The method of claim 15, further comprising determining the selected orientation for the user interface based on the orientation of the face detected in the captured image in response to the orientation of the device relative to gravity being determined to be ambiguous based on motion of the device.

18. The method of claim 15, wherein the selected orientation is determined using an orientation of the device relative to the orientation of the face detected in the captured image.

19. The method of claim 15, further comprising authenticating the subject in the captured image to be an authorized user of the device using a facial recognition authentication process operating on the captured image in response to the face being detected in the captured image.

20. The method of claim 15, further comprising determining attention of the subject in the captured image using an attention detection process operating on the captured image in response to the face being detected in the captured image.

* * * * *